(12) United States Patent
Chang

(10) Patent No.: US 6,838,602 B2
(45) Date of Patent: Jan. 4, 2005

(54) INSTRUMENT SUPPORT ELBOW

(76) Inventor: Ming-Yi Chang, No. 42, Tzchiang 1$^{st}$ Street, North District, Taichung City (TW)

( * ) Notice: Subject to any disclaimer, the term of this patent is extended or adjusted under 35 U.S.C. 154(b) by 62 days.

(21) Appl. No.: 10/441,199

(22) Filed: May 20, 2003

(65) Prior Publication Data
US 2004/0231489 A1 Nov. 25, 2004

(51) Int. Cl.$^7$ ................................................. G01D 3/00
(52) U.S. Cl. ............................ 84/327; 84/421; 84/422.3
(58) Field of Search ........................ 84/327, 421, 422.3

(56) References Cited
U.S. PATENT DOCUMENTS
6,274,797 B1 * 8/2001 Liao .............................. 84/421
6,344,605 B1 * 2/2002 Liao .............................. 84/421

* cited by examiner

Primary Examiner—Shih-Yung Hsieh
(74) Attorney, Agent, or Firm—Rosenberg, Klein & Lee

(57) ABSTRACT

An instrument support elbow includes a seat body. A coupling seat upward extends from one side of the seat body for rotatably coupling with a rotary block. The rotary block is formed with a radial through hole for a support rod to extend therethrough. The rotary block is formed with a cavity perpendicularly intersecting the through hole. A fixing member passes through the cavity to the through hole. The fixing member is formed with a ring hole corresponding to the through hole, whereby the support rod extends through the ring hole and the through hole. A turning member extending out of the rotary block serves to drive the fixing member to move along the radius of the support rod.

5 Claims, 8 Drawing Sheets

INSTRUMENT SUPPORT ELBOW

BACKGROUND OF THE INVENTION

The present invention is related to an improved instrument support elbow, and more particularly to a support elbow for supporting a percussion. The support rod of the support elbow is more firmly fixed so as to reliably locate the percussion in its true position.

A percussion such as a jazz drum or a cymbal is generally equipped with an angle adjustment structure for easy percussion. Referring to FIGS. 6–8, the cymbal 6 is supported by a support rod 61 that is fixedly connected with a stand 62 via a support elbow 7. The support elbow 7 has a seat body 71 fixed on the stand 62. A coupling seat 72 upward extends from one side of the seat body 71 for coupling with a rotary block 73. The rotary block 73 is formed with an axial thread hole 731 and a radial through hole 732 passing through the thread hole 731. The support rod 61 extends through the through hole 732. The coupling seat 72 is locked at one end of the thread hole 731 of the rotary block 73 by a first bolt 74 for fixing the rotary block 73. The coupling faces of the coupling seat 72 and the rotary block 73 are formed with cooperative toothed sections 721, 733 for locating the rotary block 73. A second bolt 75 is screwed in the other end of the thread hole 731 of the rotary block 73 opposite to the first bolt 74 for fixing the support rod 61 in the through hole 732.

In use, the first bolt 74 is unscrewed, whereby the rotary block 73 can be rotated to adjust the inclination of the support rod 61. The second bolt 75 can be also unscrewed to adjust the length of the support rod 61. Accordingly, the cymbal 6 can be adjusted to an optimal position. Then the first and second bolts 74, 75 are screwed to fix the cymbal 6 in the position.

When performing percussion, the cymbal 6 suffers a downward striking force. Under such circumstance, the position of the cymbal 6 may change. The end face 751 of the second bolt 75 directly tightly abuts against the support rod 61 to fix the support rod 61. The area of the end face 751 is small. As a result, when suffering the downward impact, the support rod 61 will slip down to lower the cymbal 6. Therefore, a performer needs to continuously adjust the position of the cymbal 6.

SUMMARY OF THE INVENTION

It is therefore a primary object of the present invention to provide an improved instrument support elbow having a seat body. A coupling seat upward extends from one side of the seat body for rotatably coupling with a rotary block. A coupling face of the rotary block facing the coupling seat is formed with an axial thread hole. The coupling faces of the rotary block and the coupling seat are formed with cooperative toothed sections for locating the rotary block. A bolt extends through the coupling seat and is screwed in the thread hole of the rotary block for fixing the rotary block. The rotary block is formed with a radial through hole for a support rod to extend therethrough. The rotary block is formed with a cavity perpendicularly intersecting the through hole. The support rod extending through the through hole passes through the cavity. A fixing member is disposed in the cavity. The fixing member is formed with a ring hole corresponding to the through hole, whereby the support rod extends through the ring hole and the through hole. A turning member extending out of the rotary block serves to drive the fixing member to move along the radius of the support rod. The circumference of the ring hole of the fixing member contacts with the support rod by larger area. Therefore, the support rod is more firmly fixed. When striking the cymbal, the support rod will not displace due to the impact.

The present invention can be best understood through the following description and accompanying drawings wherein;

DETAILED DESCRIPTION OF THE PREFERRED EMBODIMENTS

Figure 1:
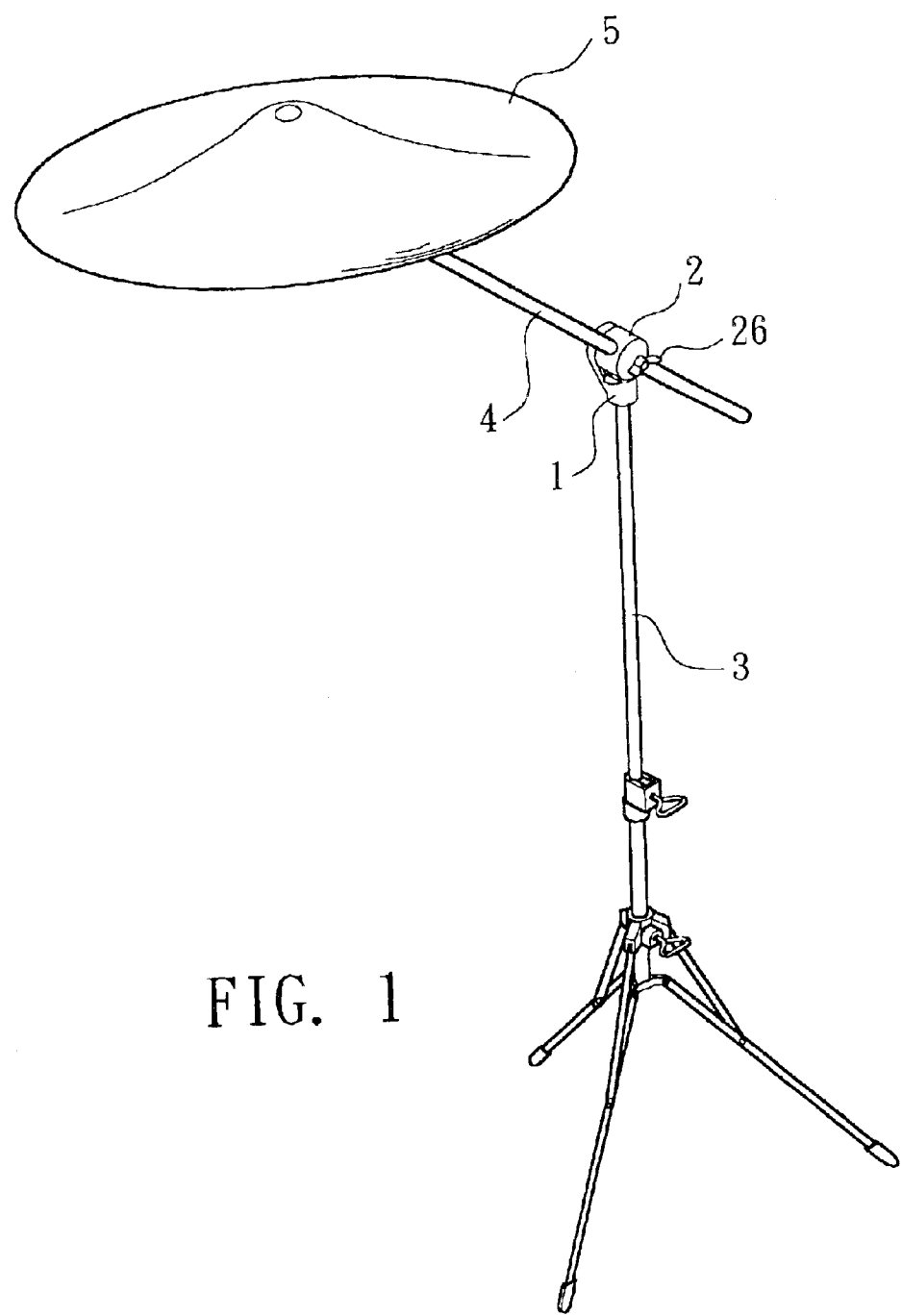
FIG. 1 is a perspective view showing that the present invention is applied to a cymbal.
Figure 2:
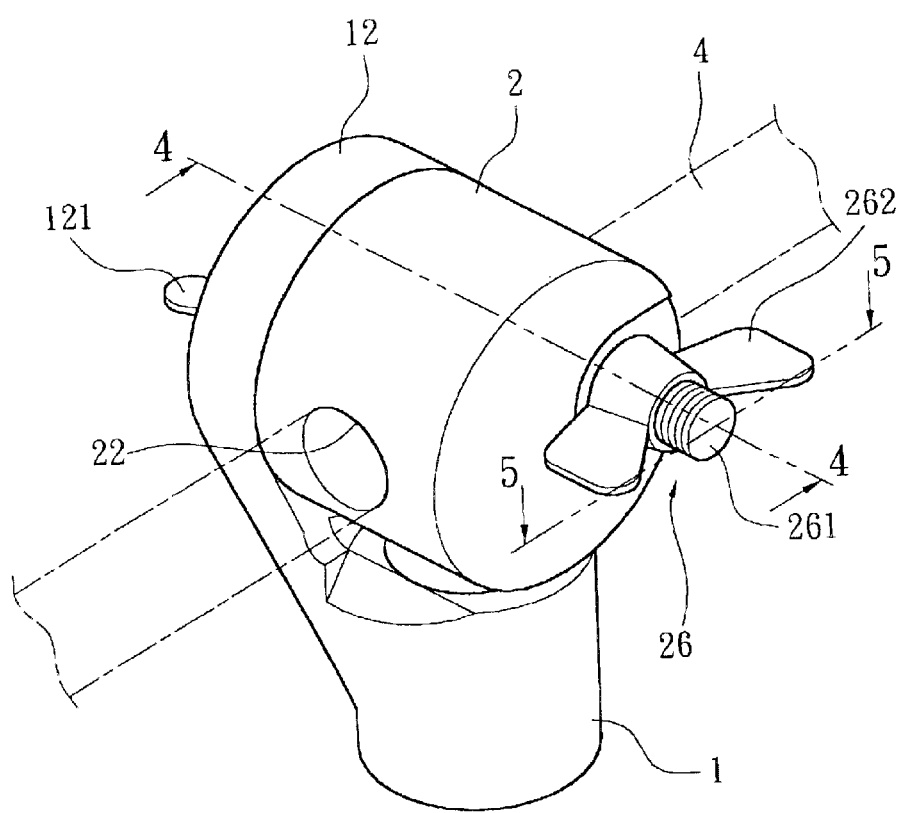
FIG. 2 is a perspective assembled view of the present invention.
Figure 3:
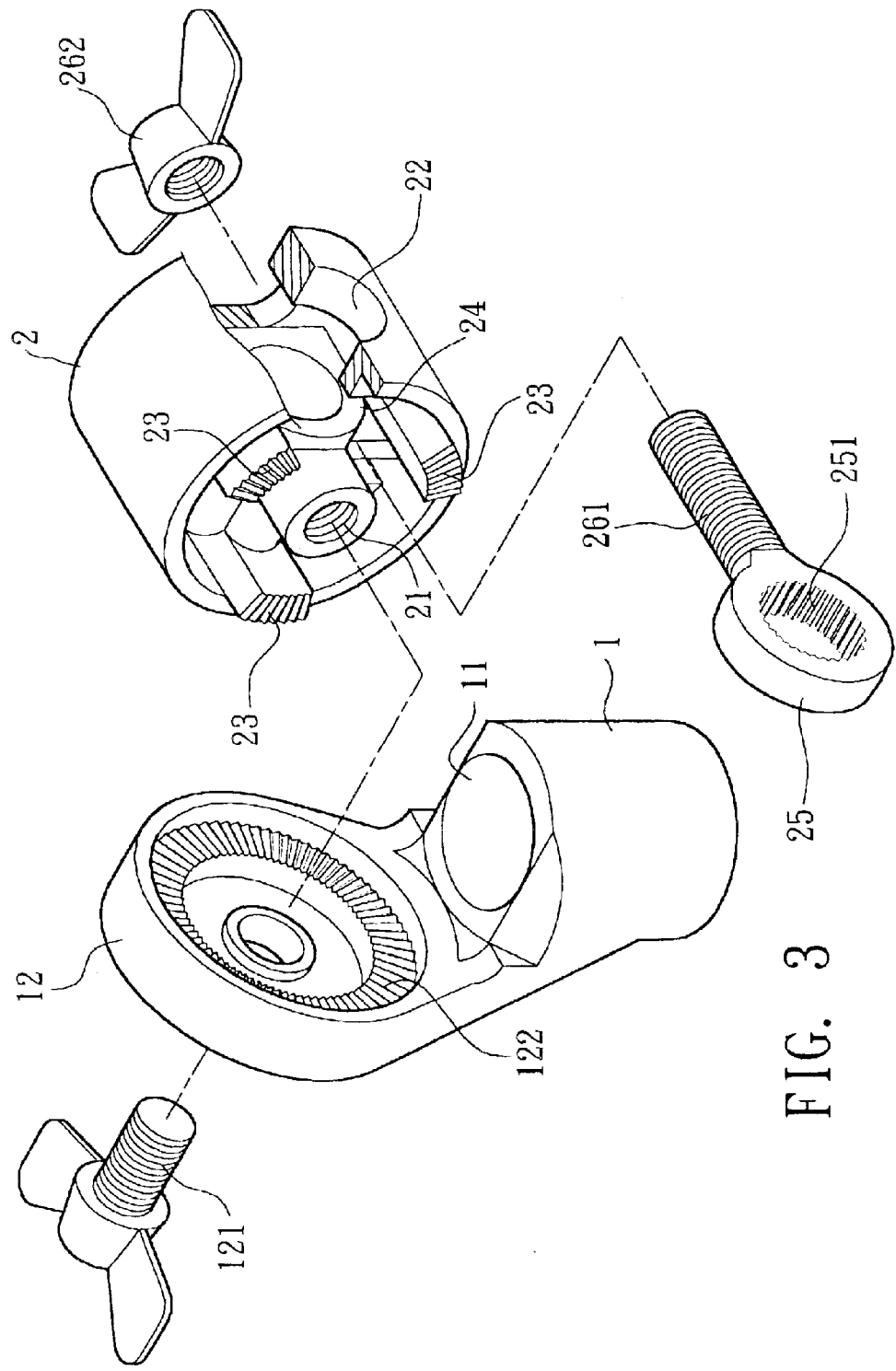
FIG. 3 is a perspective exploded view of the present invention.
Figure 4:
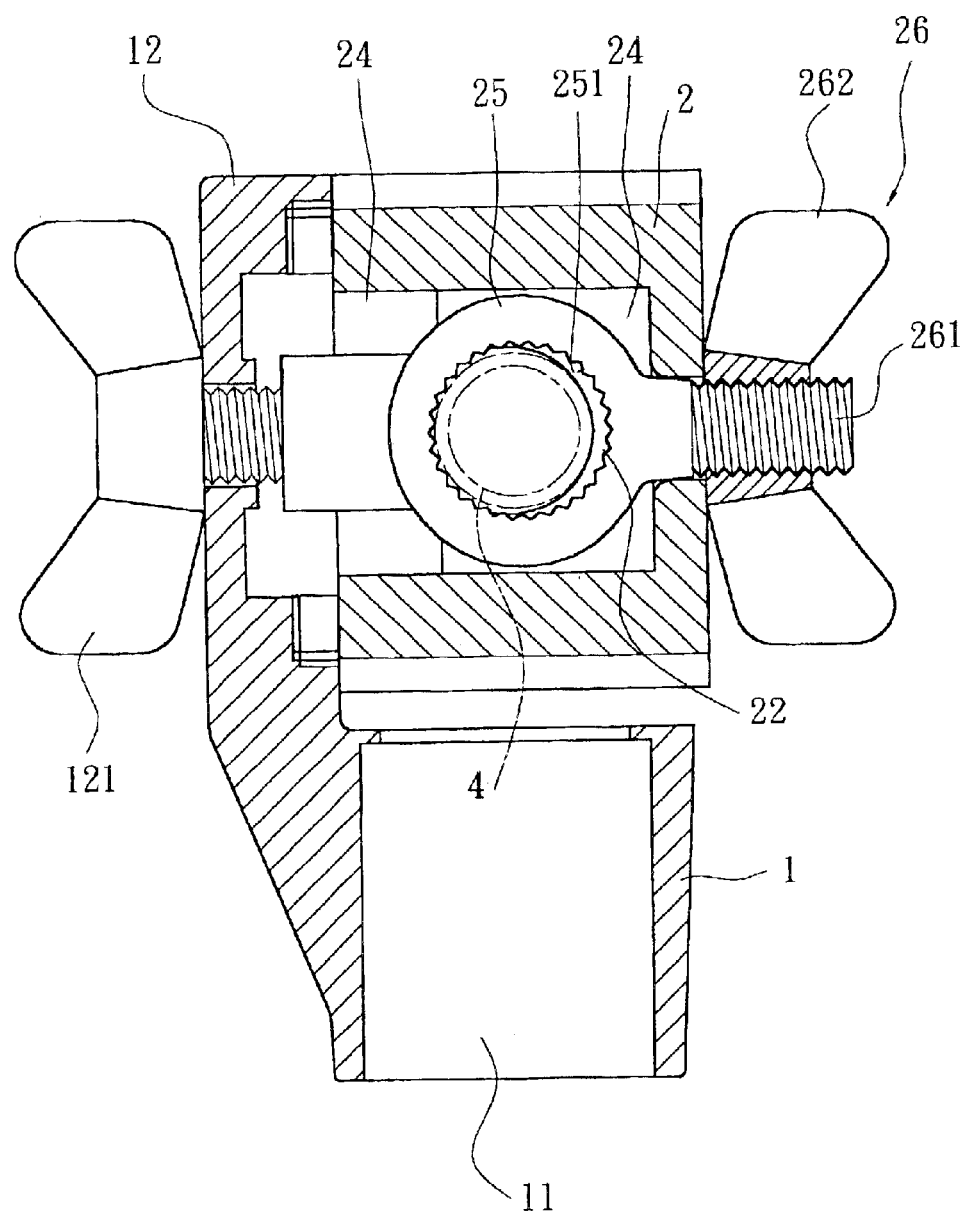
FIG. 4 is a sectional view taken along line 4—4 of FIG. 2.
Figure 5:
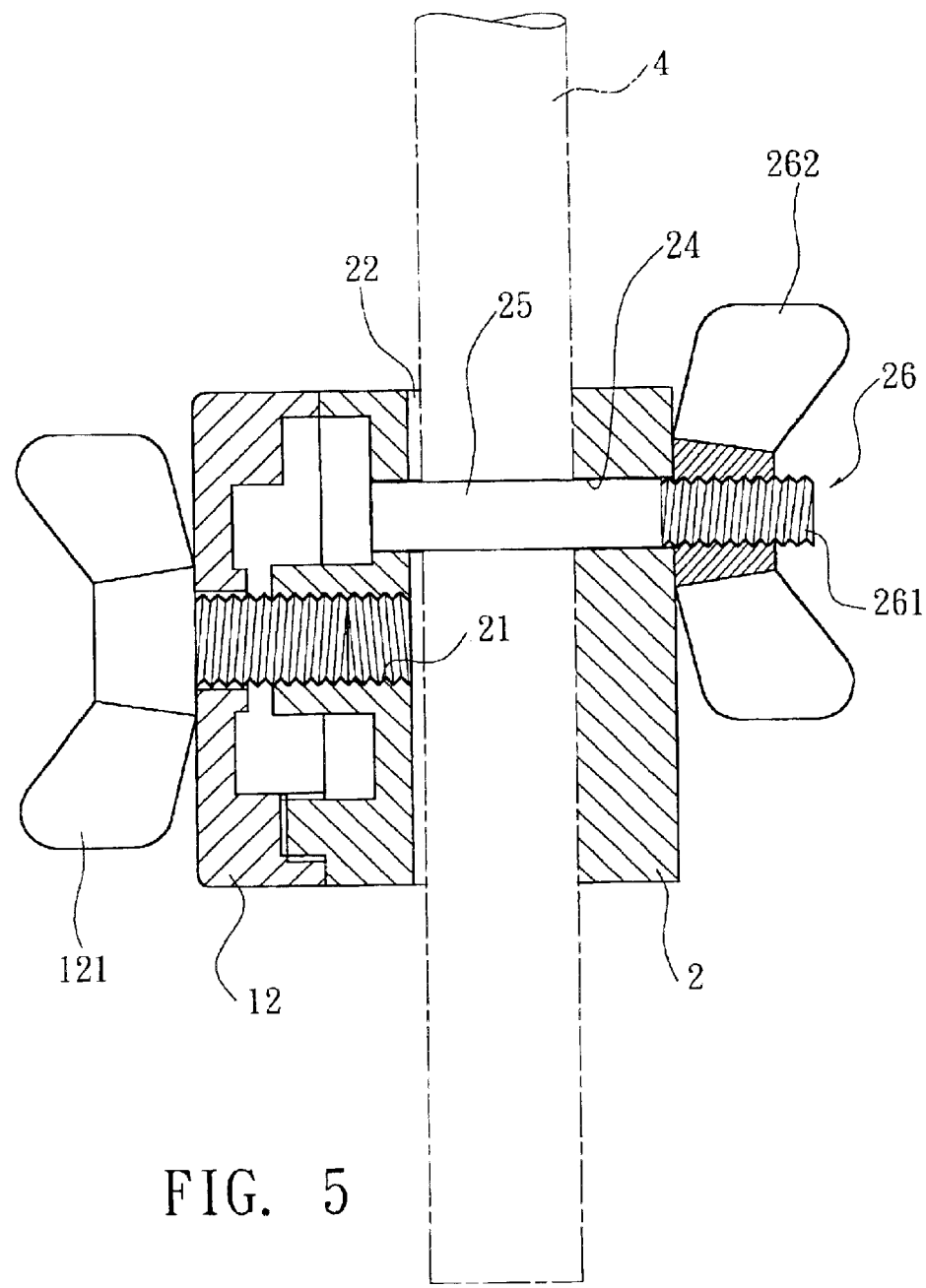
FIG. 5 is a sectional view taken along line 5—5 of FIG. 2.
Figure 6:
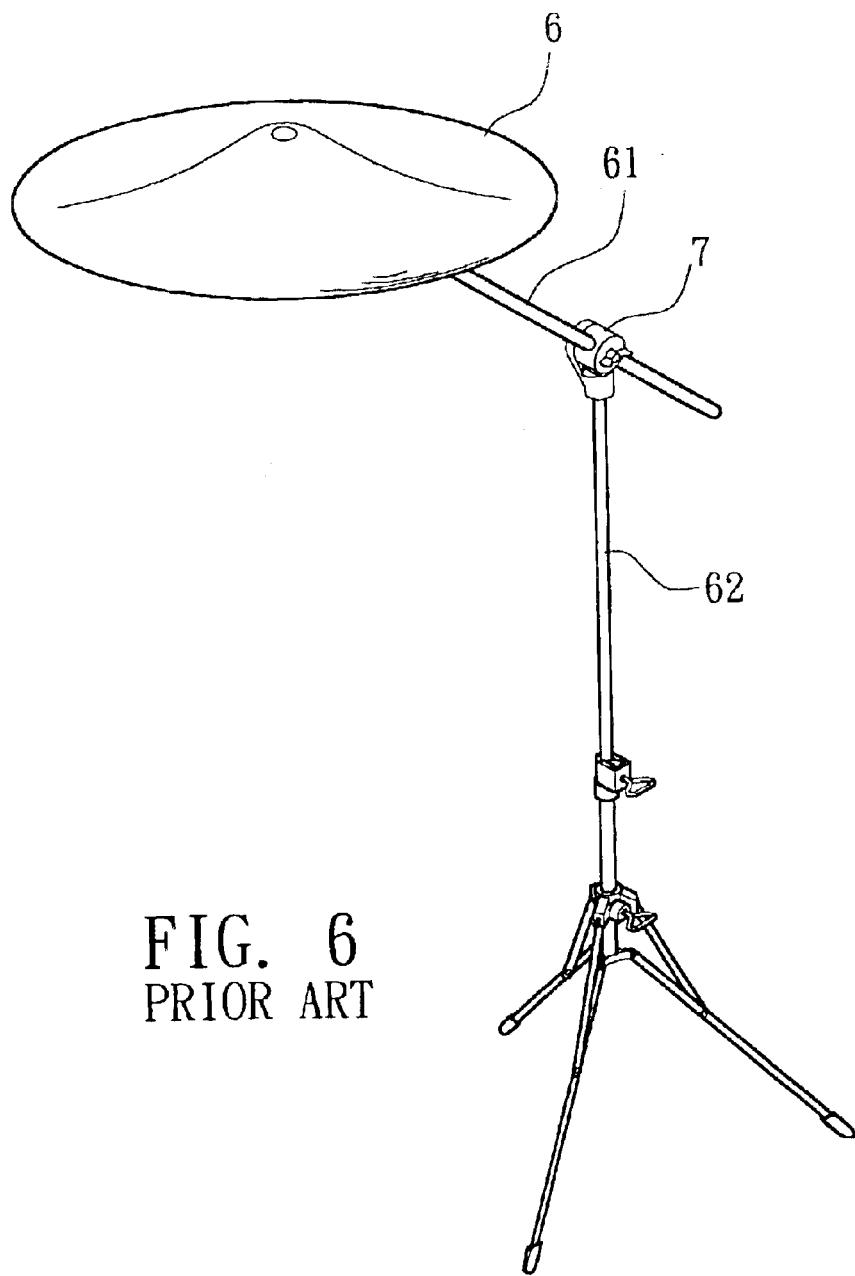
FIG. 6 is a perspective view showing that a conventional support elbow is applied to a cymbal.
Figure 7:
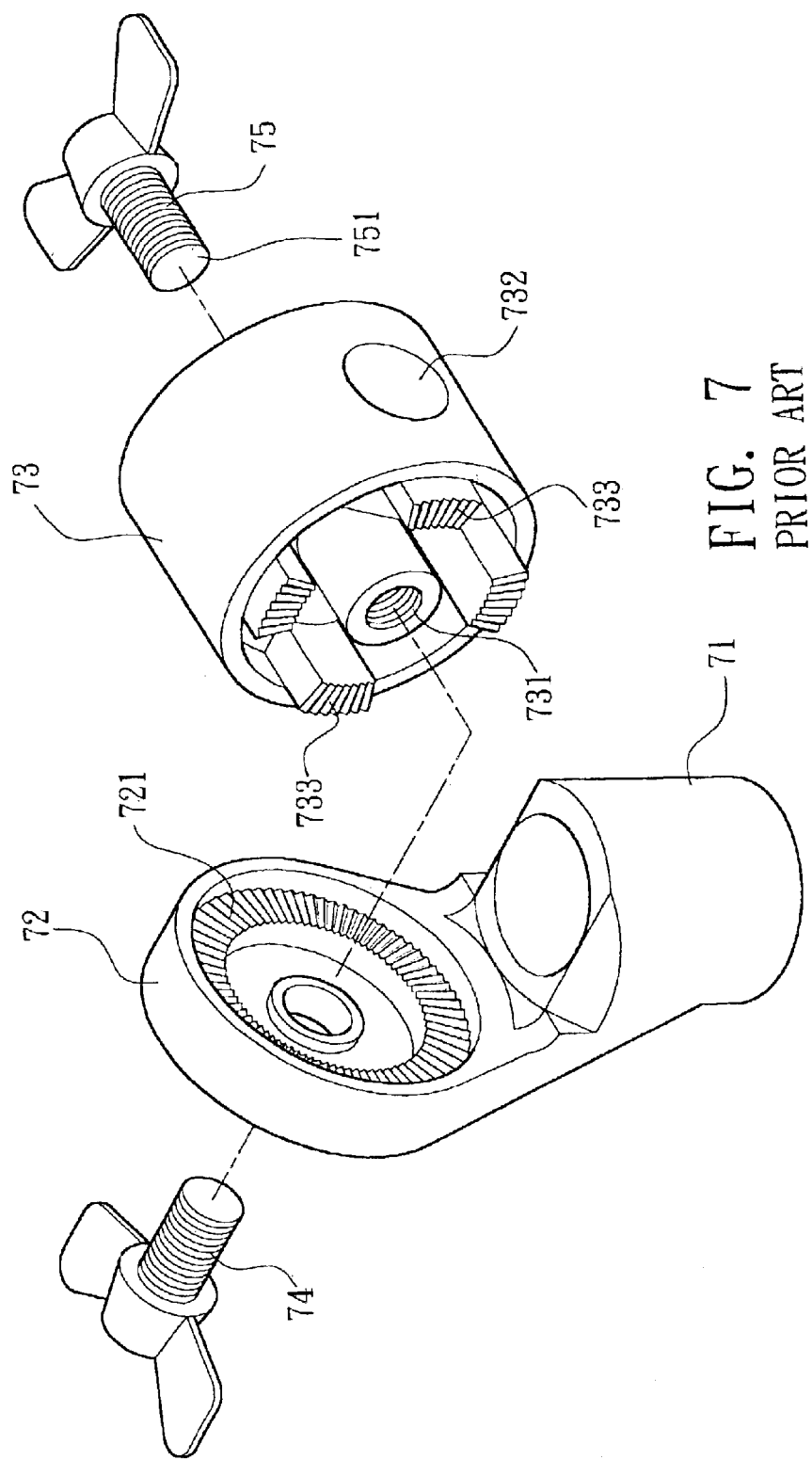
FIG. 7 is a perspective exploded view of the conventional support elbow.
Figure 8:
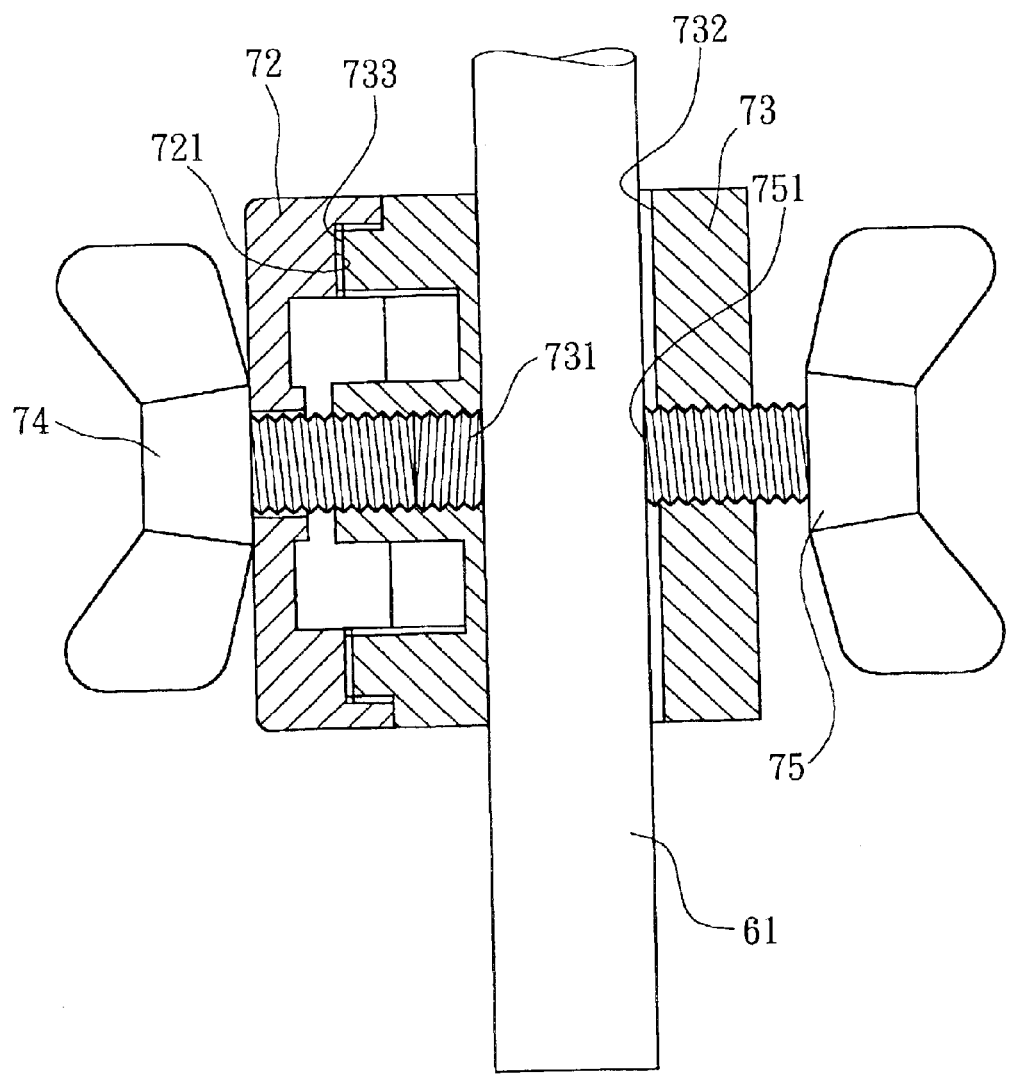
FIG. 8 is a sectional view showing that the end face of the bolt of the conventional support elbow abuts against the support rod.

Please refer to FIGS. 1 to 3. In a preferred embodiment, the instrument support elbow of the present invention is used to support a cymbal. The support elbow has a seat body 1 formed with an insertion hole 11 for fixedly connecting the seat body 1 with top end of a stand 3. A coupling seat 12 upward extends from one side of the seat body 1 for rotatably coupling with a rotary block 2. A coupling face of the rotary block 2 facing the coupling seat 12 is formed with an axial thread hole 21. The coupling faces of the rotary block 2 and the coupling seat 12 are formed with cooperative toothed sections 122, 23 for locating the rotary block 2. A bolt 121 extends through the coupling seat 12 and screwed in the thread hole 21 of the rotary block 2 for fixing the rotary block 2.

The rotary block 2 is formed with a cavity 24 on one side of the thread hole 21 for a fixing member 25 to axially pass therethrough. The rotary block 2 is formed with a radial through hole 22 passing through the cavity 24. A support rod 4 extends through the through hole 22 for supporting a cymbal 5. In this embodiment, the fixing member 25 is a retainer ring formed with a ring hole 251 corresponding to the through hole 22. The support rod 4 extends through the ring hole 251 and the through hole 22. The circumference of the ring hole 251 is formed with multiple teeth for more firmly fixing the support rod 4. A turning member 26 extending out of the rotary block 2 drives the fixing member 25 to move along the radius of the support rod 4. In this embodiment, the turning member 26 is a threaded section 261 extending from the fixing member 25. The threaded section 261 extends out of the rotary block 2 and is locked with a rotary switch 262. In this embodiment, the rotary switch 262 is a butterfly nut.

When turning tight the turning member 26, the fixing member 25 will move along the radius of the support rod 4. At this time, the wall of the ring hole 251 of the fixing member 25 will tightly abut against the support rod 4 to fix the same. The teeth of the circumference of the ring hole 251 serve to enhance the stability of the fixed support rod 4.

The circumference of the ring hole 251 of the fixing member 25 contacts with the support rod 4 by larger area. Therefore, the support rod 4 is more firmly fixed. As a result, when striking the cymbal 5, the support rod 4 will not displace due to the impact.

The above embodiments are only used to illustrate the present invention, not intended to limit the scope thereof. Many modifications of the above embodiments can be made without departing from the spirit of the present invention.

What is claimed is:

1. An instrument support elbow comprising a seat body, a coupling seat upward extending from one side of the seat body for rotatably coupling with a rotary block, a coupling face of the rotary block facing the coupling seat being formed with an axial thread hole, the coupling faces of the rotary block and the coupling seat being formed with cooperative toothed sections for locating the rotary block, a bolt extending through the coupling seat and being screwed in the thread hole of the rotary block for fixing the rotary block, the rotary block being formed with a radial through hole for a support rod to extend therethrough, said instrument support elbow being characterized in that the rotary block is formed with a cavity perpendicularly intersecting the through hole, the support rod extending through the through hole passing through the cavity, a fixing member being disposed in the cavity, the fixing member being formed with a ring hole corresponding to the through hole, whereby the support rod extends through the ring hole and the through hole, a turning member extending out of the rotary block serving to drive the fixing member to move along the radius of the support rod.

2. The instrument support elbow as claimed in claim 1, wherein the cavity is formed on one side of the thread hole of the rotary block facing the coupling seat for disposing the fixing member in the cavity.

3. The instrument support elbow as claimed in claim 1, wherein the fixing member is a retainer ring formed with a ring hole corresponding to the through hole, the turning member being a threaded section extending from the retainer ring, the threaded section extending out of the rotary block and being locked with a rotary switch.

4. The instrument support elbow as claimed in claim 3, wherein the rotary switch is a butterfly nut.

5. The instrument support elbow as claimed in claim 3, wherein the circumference of the ring hole of the retainer ring is formed with multiple teeth.

* * * * *